US006529870B1

(12) United States Patent
Mikkilineni (10) Patent No.: US 6,529,870 B1
(45) Date of Patent: Mar. 4, 2003

(54) IDENTIFYING VOICE MAIL MESSAGES USING SPEAKER IDENTIFICATION

(75) Inventor: Rajendra Prasad Mikkilineni, Gahanna, OH (US)

(73) Assignee: Avaya Technology Corporation, Basking Ridge, NJ (US)

( * ) Notice: Subject to any disclaimer, the term of this patent is extended or adjusted under 35 U.S.C. 154(b) by 0 days.

(21) Appl. No.: 09/411,754

(22) Filed: Oct. 4, 1999

(51) Int. Cl.[7] .................... C10L 17/00; G10L 11/00; H04M 3/42; H04L 9/32
(52) U.S. Cl. ................ 704/246; 704/276; 455/415; 379/1.02
(58) Field of Search .................. 704/270, 273, 704/231–250, 246, 276; 379/88.19, 88.04–22, 197, 211.02, 1.02; 455/415

(56) References Cited

U.S. PATENT DOCUMENTS

| | | | | | |
|---|---|---|---|---|---|
| 4,773,093 | A | * | 9/1988 | Higgins et al. | 704/247 |
| 5,797,124 | A | * | 8/1998 | Walsh et al. | 704/270 |
| 5,875,232 | A | * | 2/1999 | Wolf | 379/88.19 |
| 5,905,774 | A | * | 5/1999 | Tatchell et al. | 379/88.04 |
| 5,949,776 | A | | 9/1999 | Mahany et al. | 370/338 |
| 5,999,611 | A | * | 12/1999 | Tatchell et al. | 379/211.02 |
| 6,160,877 | A | * | 12/2000 | Tatchell et al. | 379/197 |
| 6,215,859 | B1 | * | 4/2001 | Hanson | 379/88.22 |
| 6,289,212 | B1 | | 9/2001 | Stein et al. | 455/412 |
| 6,292,782 | B1 | * | 9/2001 | Weideman | 704/273 |

FOREIGN PATENT DOCUMENTS

EP 0 944 004 A1 9/1999 ............ G06F/17/00

OTHER PUBLICATIONS

Millilineni et al ("Isolated World Recognition over the DDD Telephone Network. Results of Two Extensive Field Studies", Wilpon J.G.; DeMarco, D.M.; Mikkilineni, R.P., International Conference on Acoustics, Speech and Signal Processing, 1988).*

Millilineni et al ("Speaker Verification Based on a Vector Quantization Approach that incorporates Speaker Cohort Models and a Linear Discriminator", Belfield, W.R.; Mikkilineni, R.P., Systems, Man, and Cybernetics, 1997).*
"Accessing Messages Your Way," AT&T Technology, XP–000530274, 10 (1995) spring, No. 1, New York, US, 2 pages.
"AOL & Microsoft Fight Over Instant Messaging Continues," XP–002188386, Jul. 26, 1999, 1 page.
"Intuity UDIX Multimedia Messaging System," Lucent Technologies, 6/99.
Padmanabhan, M. et al., "Speech Recognition Performance on a Voicemail Transcription Task," IEEE, 0–7803–4428–6/98, pp 913–916, 6/98.
"Octel Visual Messenger," Lucent Technologies, Jan. 19, 1998.
Belfield, W.R. et al., "Speaker Verification Based on a Vector Quantization Approach that Incorporates Speaker Cohort Models and a Linear Discriminator," IEEE SMC '97, 10/97.
Mammone, R.J., "Robust Speaker Recognition," IEEE Signal Processing Magazine, pp 58–71, 9/96.

(List continued on next page.)

Primary Examiner—Richemond Dorvil
Assistant Examiner—Daniel A. Nolan
(74) Attorney, Agent, or Firm—Haverstock & Owens LLP (57) ABSTRACT

A method and apparatus for identifying voice mail messages uses speaker identification to identify a voice mail message. The method preferably includes comparing the voice mail message to existing voice samples in order to determine a matching coefficient. If the matching coefficient is within an allowed range, the voice mail message is categorized as a matched voice mail message and a name indicator is coupled to the voice mail message. The apparatus includes a user interface, a processing unit, and a storage media. The user interface receives the voice mail message and allows access to the voice mail message by a voice mail recipient. The processing unit compares the voice mail message to the existing voice samples, determines the matching coefficient, and assigns the name indicator. The storage media stores the voice mail message.

56 Claims, 9 Drawing Sheets

OTHER PUBLICATIONS

Furui, S., "An Overview of Speaker Recognition Technology," Chap. 2 of Lee, C. et al., *Automatic Speech and Speaker Recognition*, Kluwer Academic Press, Boston, pp 31–56, 1996.

Rosenberg, A.E. et al., "Recent Research in Automatic Speaker Recognition," Chap. 22 of Furui, S. et al. *Advances in Speech Signal Processing*, Marcel Dekker, New York, pp 701–738, 1992.

Lippmann, R.P., "An Introduction to Computing with Neural Nets," IEEE ASSP Magazine, pp 4–22, 4/87.

Furui, S., "Cepstral Analysis Technique for Automatic Speaker Verification," IEEE Transactions on Acoustics, Speech, and Signal Processing, vol. ASSP–29, No. 2, 4/81.

Linde, Y. et al., "An Algorithm for Vector Quantizer Design," IEEE Transactions on Communications, vol. COM–28, No. 1, 1/80.

\* cited by examiner

IDENTIFYING VOICE MAIL MESSAGES USING SPEAKER IDENTIFICATION

FIELD OF THE INVENTION

This invention relates to the field of voice mail messaging. More particularly, this invention relates to the field of identifying voice mail messages.

BACKGROUND OF THE INVENTION

Figure 1:
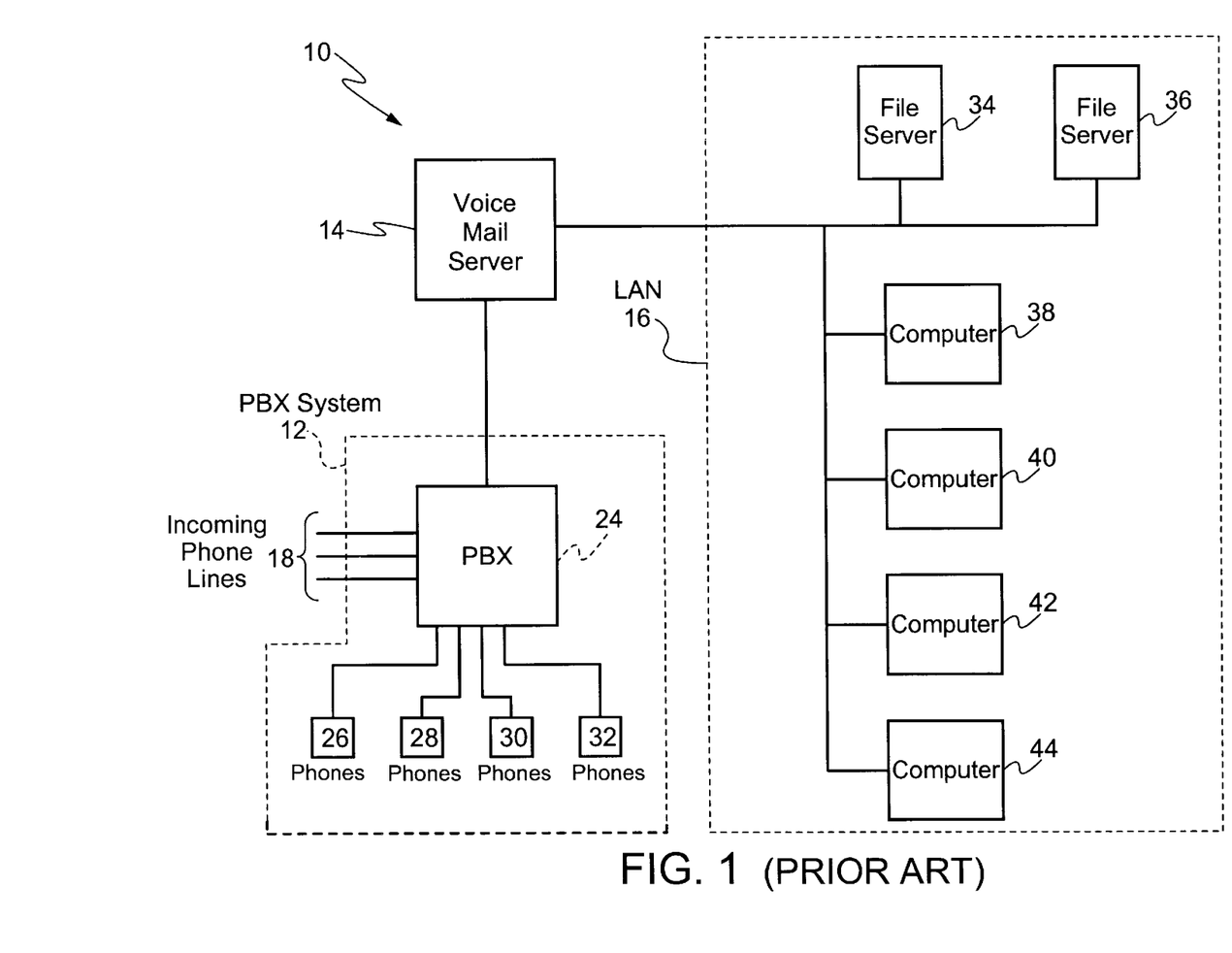
FIG. 1 illustrates a voice mail system of the prior art.

A voice mail system of the prior art is illustrated in FIG. 1. The voice mail system 10 includes a PBX (Private Branch eXchange) telephone system 12, a voice mail server 14, and a LAN (Local Area Network) 16. Incoming telephone lines 18 are coupled to the PBX telephone system 12. The PBX telephone system 12 is coupled to the voice mail server. The voice mail server 14 is coupled to the LAN.

The PBX telephone system 12 includes a PBX 24 and first, second, third, and fourth telephones, 26, 28, 30, and 32. The first, second, third, and fourth telephones, 26, 28, 30, and 32 are coupled to the PBX 24. The PBX telephone system 12 can include more or less telephones than the first, second, third, and fourth telephones, 26, 28, 30, and 32. The PBX 24 is coupled to the voice mail server 14.

The LAN 16 includes first and second file servers, 34 and 36, and first, second, third, and fourth computers, 38, 40, 42, and 44. The first and second file servers, 34 and 36, and the first, second, third, and fourth computers, 38, 40, 42, and 44, are coupled together by computer network cables. The LAN can include more or less file servers and more or less computers.

In operation, a telephone caller will place a telephone call. The PBX 24 routes the telephone call to an appropriate telephone, for example the first telephone 26. If the telephone call is unanswered, the telephone caller will be prompted to leave a voice mail message for a voice mail recipient. The voice mail message is received by the voice mail server 14. The voice mail server 14 routes the voice mail message to an appropriate file server, for example the first file server 34, for storage.

The voice mail recipient retrieves the voice mail message by accessing the voice mail server 14 via the first, second, third, or fourth telephones, 26, 28, 30, or 32, via the external telephone, or via the first, second, third, or fourth computers, 38, 40, 42, or 44. When accessing the voice mail server 14 via the first, second, third, or fourth telephone, 26, 28, 30, or 32, or via the external telephone, the voice mail recipient will typically retrieve the voice mail message using touch-tone telephone keys and a voice prompted menu system. When accessing the voice mail message using the first, second, third, or fourth computers, 38, 40, 42, or 44, the voice mail recipient uses a voice mail GUI (Graphical User Interface), and a speaker coupled to the first, second, third, or fourth computer, 38, 40, 42, or 44. The speaker can be part of the first, second, third, or fourth telephone, 26, 28, 30, or 32, or can be a separate speaker.

Figure 2:
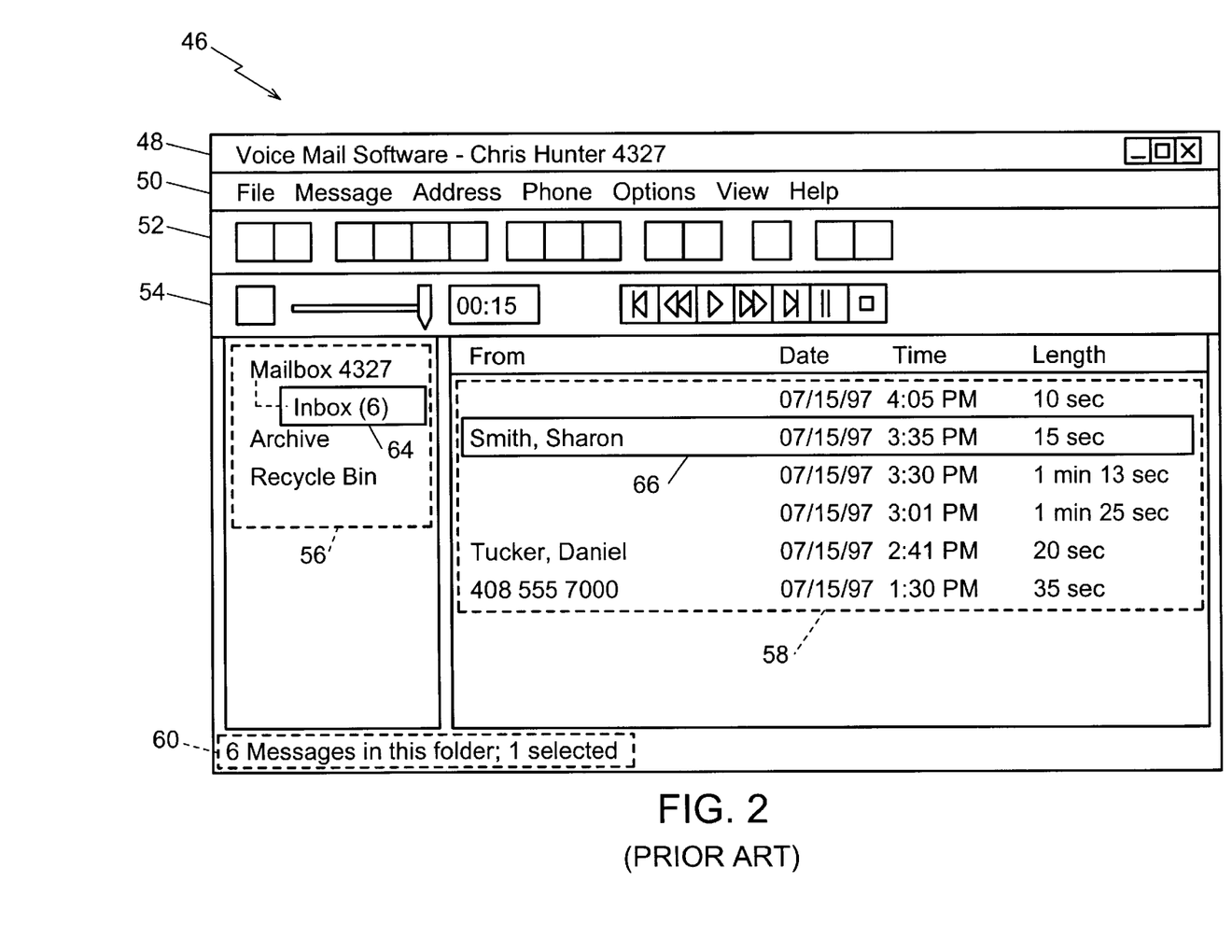
FIG. 2 illustrates a voice mail GUI (Graphical User Interface) of the prior art.

The voice mail GUI of the prior art is illustrated in FIG. 2. The voice mail GUI 46 includes a title bar 48, a drop-down menu bar 50, an icon menu bar 52, a system control bar 54, a folder list 56, a voice mail message list 58, and a message list status 60. The title bar 48 indicates a software title, which in this case is "Voice Mail Software," a generic title. The title bar 48 also indicates a voice mail recipient name, which in this case is "Chris Hunter," and a telephone extension number, which in this case is "4327." The drop-down menu bar 50, the icon menu bar 52, and the system control bar 54 are typical of GUI's in general.

The folder list 56 includes an inbox 64, which indicates that there are six voice mail messages in the inbox 64. Since the inbox 64 is highlighted, the voice mail message list 58 displays the six voice mail messages in the inbox 64. The message list status 60 indicates that the six voice mail message are in the inbox 64 and that one voice mail message 66 is highlighted. The voice mail message list 58 of the prior art will identify a telephone caller name if the telephone caller is calling from an internal telephone, for example the second telephone 28, using ANI (Automatic Number Identification). The ANI is integral to the voice mail server 14. The voice mail server 14 is programmed with either the telephone caller name, a location, such as "library," or a telephone extension number for the first, second, third, and fourth telephones, 26, 28, 30, and 32.

The voice mail message list 58 of the prior art will indicate a caller telephone number or the telephone caller name if ICLID (InComing Line IDentification) is present. The telephone caller name is indicated if the voice mail server 14 has been programmed to indicate the telephone caller name rather than the caller telephone number for the ICLID.

It would be advantageous to be able to identify the telephone caller name for the voice mail message when the ANI or the ICLID is not present. Further, it would be advantageous to be able to identify the voice mail message without relying on a specific telephone number or a specific telephone extension number for the telephone caller.

What is needed is a method of identifying the voice mail message when the ANI or the ICLID is not present. What is also needed is a method of identifying the voice mail message that identifies the telephone caller rather than the specific telephone number or the specific telephone extension that is being used by the telephone caller.

SUMMARY OF THE INVENTION

The present invention is a method and apparatus for identifying voice mail messages using speaker identification. The method preferably includes comparing a voice mail message to existing voice samples in order to determine a matching coefficient. If the matching coefficient is within an allowed range, the voice mail message is categorized as a matched voice mail message and a name indicator is coupled to the voice mail message.

The apparatus includes a user interface, a processing unit, and a storage media. The user interface is coupled to the processing unit and the processing unit is coupled to the storage media. The user interface receives the voice mail message and allows access to the voice mail message by a voice mail recipient. The processing unit compares the voice mail message to the existing voice samples, determines the matching coefficient, and assigns the name indicator. The storage media stores the voice mail message.

An embodiment of the invention includes a computer readable medium bearing computer program code. The computer program code includes means for identifying the voice mail message using the speaker identification.

DETAILED DESCRIPTION OF THE PREFERRED EMBODIMENT

Figure 3:
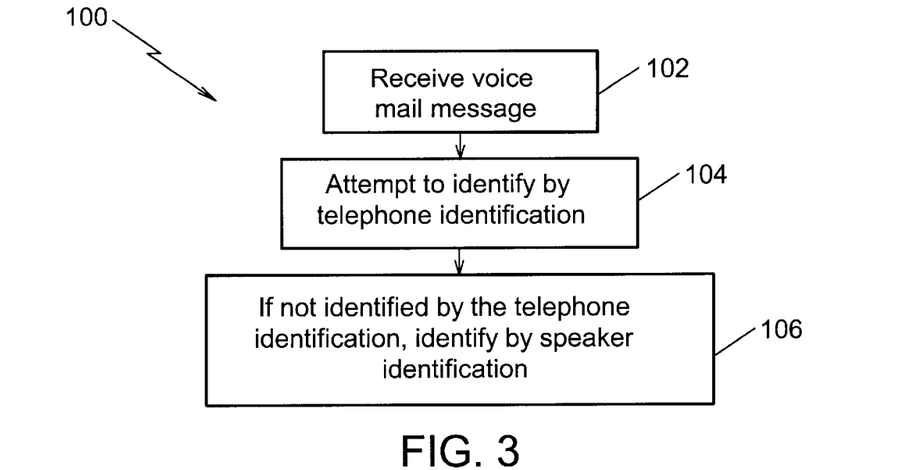
FIG. 3 illustrates the preferred method of identifying voice mail messages of the present invention.

The preferred voice mail identification method of the present invention is illustrated in FIG. 3. The preferred voice mail identification method 100 includes first, second, and third steps, 102, 104, and 106. In the first step 102, a voice mail message is received. In the second step 104, an attempt is made to identify the voice mail message by telephone number identification. The telephone number identification is either ANI (Automatic Number Identification) or ICLID (InComing Line IDentification). In the third step 106, the voice mail message is identified by the preferred speaker identification if the second step 104 is unsuccessful. The preferred voice mail identification 100 includes the telephone number identification in order to reduce processing time used for the preferred speaker identification method.

Figure 4:
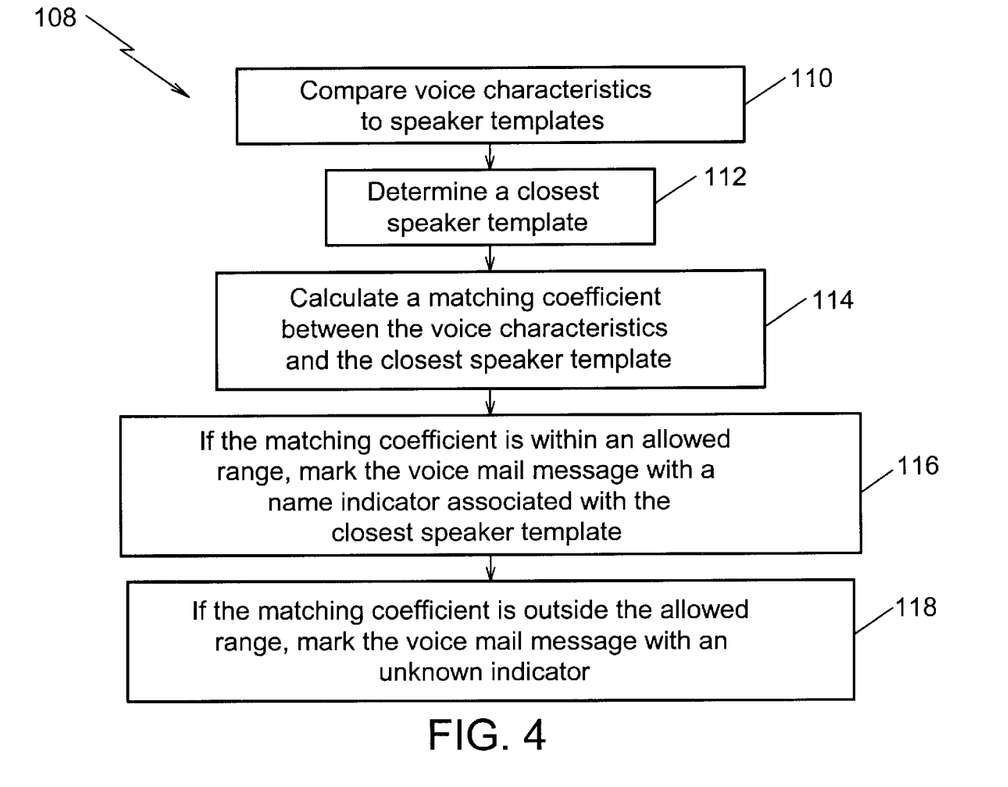
FIG. 4 illustrates the preferred speaker identification method of the present invention.

The preferred speaker identification method of the present invention is illustrated in FIG. 4. The preferred speaker identification method 108 includes fourth, fifth, sixth, seventh, and eighth steps, 110, 112, 114, 116, and 118. In the fourth step 110, voice characteristics of a telephone caller are compared to speaker templates. The speaker templates are representation of existing voice samples. In the fifth step 112, a closest speaker template is determined. In the sixth step 114, a matching coefficient is calculated. The matching coefficient is a measure of differences between the voice characteristics of the telephone caller and the closest speaker template. In the seventh step 116, the voice mail message is marked with a name indicator associated with the closest speaker template if the matching coefficient is within an allowed range. In the eighth step 118, the voice mail message is marked with an unknown indicator if the matching coefficient is outside the allowed range. Preferably, the unknown indicator is a word that indicates "unknown." Alternatively, the unknown indicator is a blank.

Preferably, the speaker templates are VQ (Vector Quantization) codebooks, which are each formed by a small number of highly representative feature vectors. The feature vectors are preferably linear predictive coding cepstral coefficients. In order to compare the voice mail message to the VQ codebooks, the voice mail message is converted to voice mail message feature vectors, which are the linear predictive coding cepstral coefficients. Alternatively, the feature vectors are the linear predictive coding cepstral coefficients and first-order regression coefficients. The first-order regression coefficients are also known as delta values.

VQ (Vector Quantization), in general, is a digital compression technique. Preferably, the voice mail message is stored in a digital format. Alternatively, the voice mail message is stored in an analog format. If the voice mail message is stored in the digital format, the voice mail message is preferably not compressed. Alternatively, the voice mail message in the digital format is compressed using the VQ.

The matching coefficient is an average distortion, which is an average distance in phase space between the voice mail feature vectors and closest feature vectors of a closest VQ codebook. The allowed range is determined by a threshold distortion. If the average distortion is less than or equal to the threshold distortion, the matching coefficient is within the allowed range. If the average distortion is greater that the threshold distortion, the matching coefficient is outside the allowed range.

Figure 5:
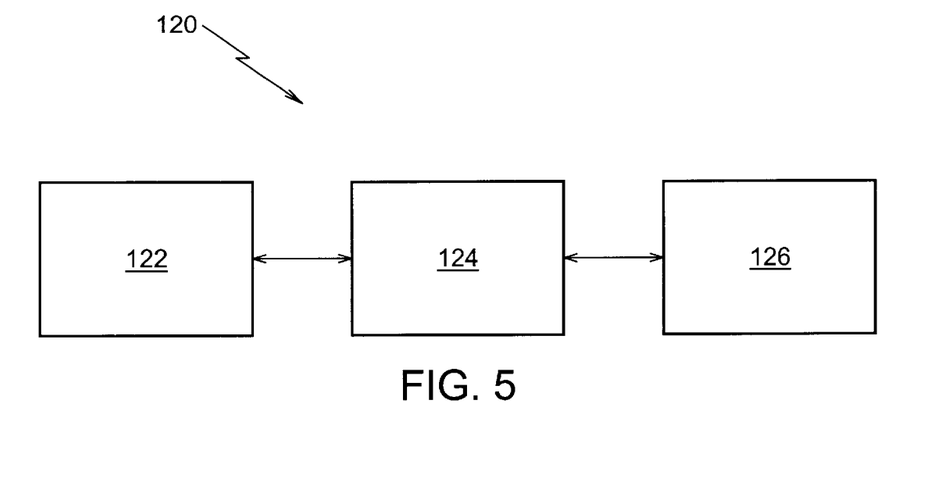
FIG. 5 illustrates the preferred apparatus for identifying voice mail messages of the present invention.

The preferred voice mail apparatus of the present invention is illustrated in FIG. 5. The preferred voice mail apparatus 120 includes a user interface 122, a processing unit 124, and a storage media 126. The user interface 122 is coupled to the processing unit 124. The processing unit 124 is coupled to the storage media 126. The user interface 122 is selected from a user interface group including an internal telephone, an external telephone, and a computer terminal. The processing unit 124 is selected from a processing unit group including a computer processing unit, first electrical circuitry associated with a specific voice mail system, and second electrical circuitry associated with a personal answering machine. The storage media 126 is selected from a storage media group including a magnetic storage media, an optical storage media, and a magneto-optical storage media.

In operation, a telephone caller leaves the voice mail message on the preferred voice mail apparatus 120 via the user interface 122. The processing unit 124 performs the preferred voice mail identification method 100 and the preferred speaker identification method 108. The processing unit 124 stores the voice mail message on the storage media 126. A voice mail recipient retrieves the voice mail message via the user interface 122. Preferably, the user interface 122 for voice mail recipient is the computer terminal used in conjunction with the internal telephone. Alternatively, the user interface is the internal telephone, used alone, or the external telephone. It will be readily apparent to one skilled in the art that the present invention can be implemented with computer software and an individual computer, including a speaker and microphone, with the individual computer coupled to a telephone system.

The voice mail recipient preferably uses the computer terminal in conjunction with the internal telephone and a voice mail GUI (Graphical User Interface) for the user interface 122.

Figure 6:
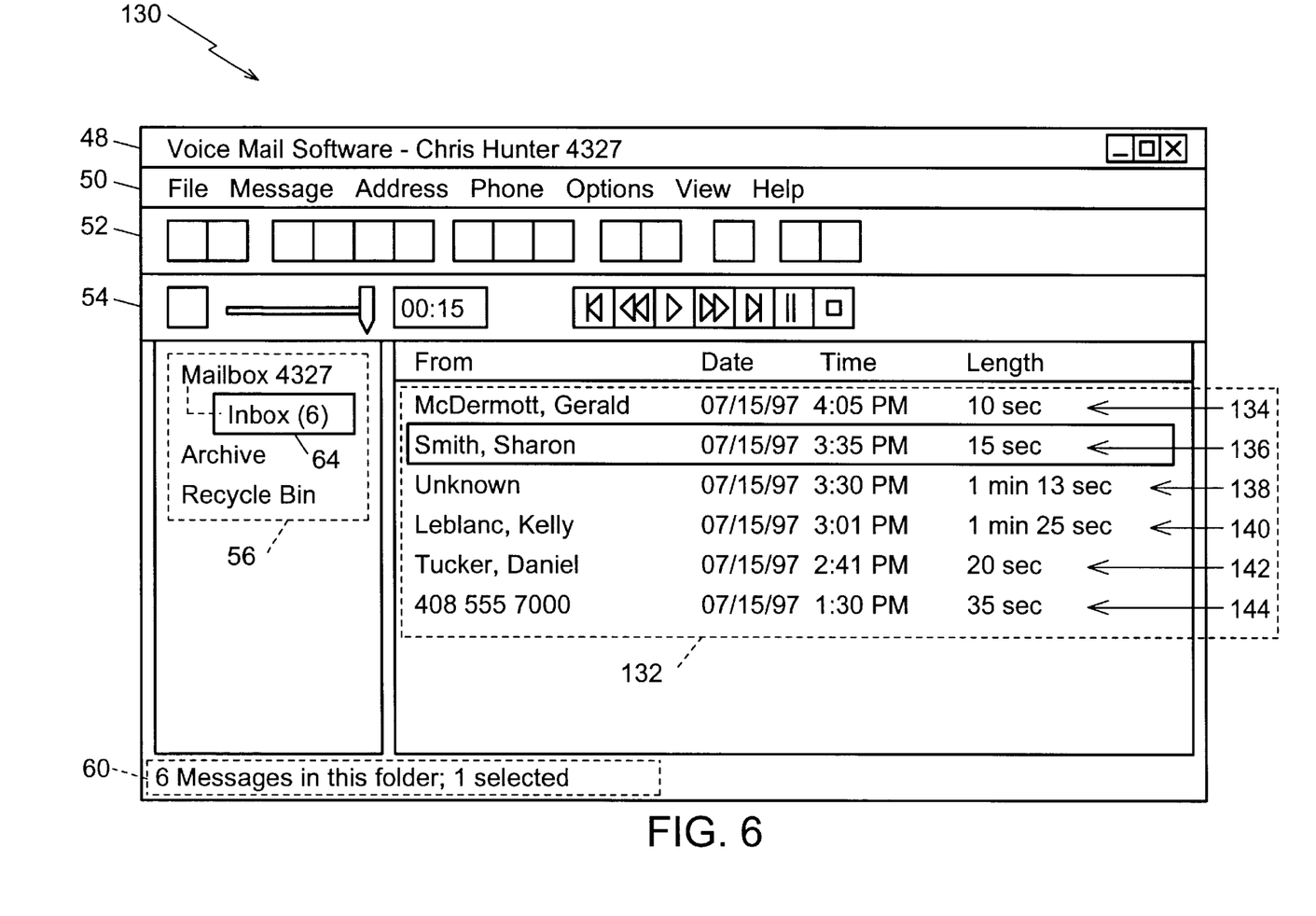
FIG. 6 illustrates the preferred method of generating speaker templates.

The voice mail GUI of the present invention is illustrated in FIG. 6. The voice mail GUI 130 includes a title bar 48, a drop-down menu bar 50, an icon menu bar 52, a system control bar 54, a folder list 56, a preferred voice mail message list 132, and a message list status 60.

The preferred voice mail message list 132 of the present invention will identify the name indicator determined by the preferred voice mail identification method 100 (FIG. 3) and the preferred speaker identification 108 (FIG. 4). In the preferred message list 132, a first voice mail message 134, with the name indicator of "McDermott, Gerald," has been identified using the preferred speaker identification method 108. A second voice mail message 136, with the name indicator of "Smith, Sharon," has been identified using the number identification. A third voice mail message 138, with the unknown indicator, has been found to not have number identification and has been found to have the matching coefficient associated for the third voice mail message 138 to be outside the allowed range.

A fourth voice mail message 140, with the name indicator of "Leblanc, Kelly," has been identified using the preferred speaker identification method 108. A fifth voice mail message 142, with the name indicator of "Tucker, Daniel," has been identified using the number identification. A sixth voice mail message 144, having the name indicator of "408 555 7000," has been identified using the number identification.

Figure 7:
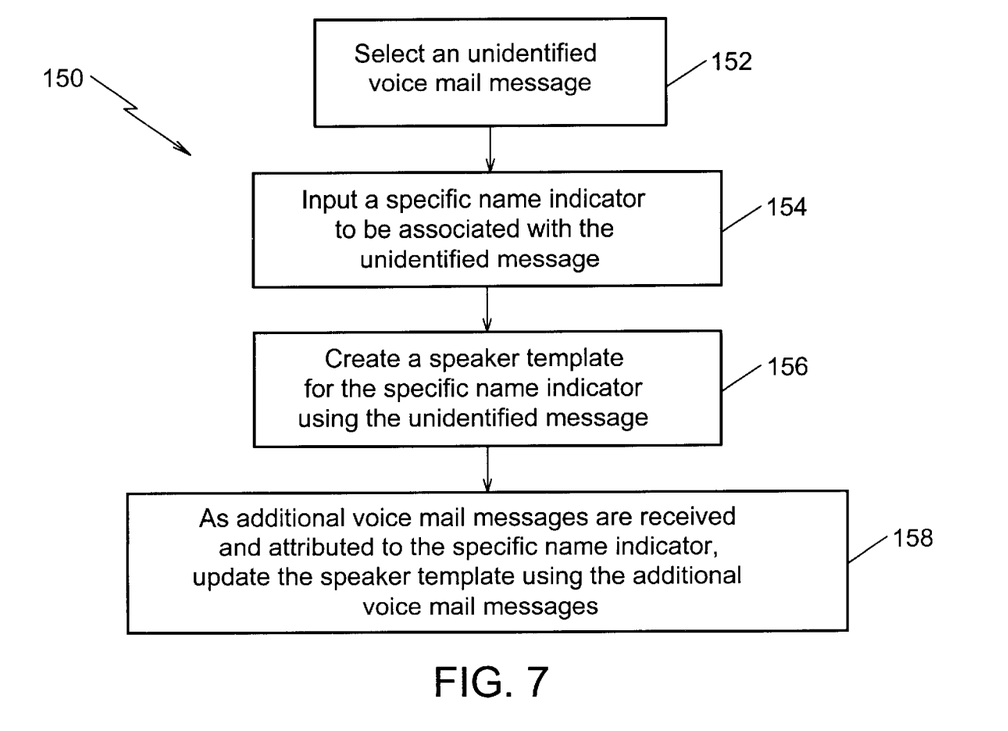
FIG. 7 illustrates a voice mail GUI of the present invention.

The preferred speaker template generation method of the present invention is ninth, tenth, eleventh, and twelfth steps, 152, 154, 156, and 158. In the ninth step 152, an unidentified voice mail message is selected. In the tenth step 154, a specific name indicator that is to be associated with the unidentified voice mail message is preferably input. Alternatively, a generic name indicator, such as a letter A, B, C, etc. is generated automatically. In the eleventh step 156, a speaker template is created for the specific name indicator using the unidentified voice mail message. In the twelfth step 158, the speaker template is preferably updated as additional voice mail messages are received and attributed to the specific name indicator using the additional voice mail messages. The unidentified voice mail message and the additional voice mail messages are training data for the speaker template. Alternatively, the twelfth step 158 is not performed.

Figure 8:
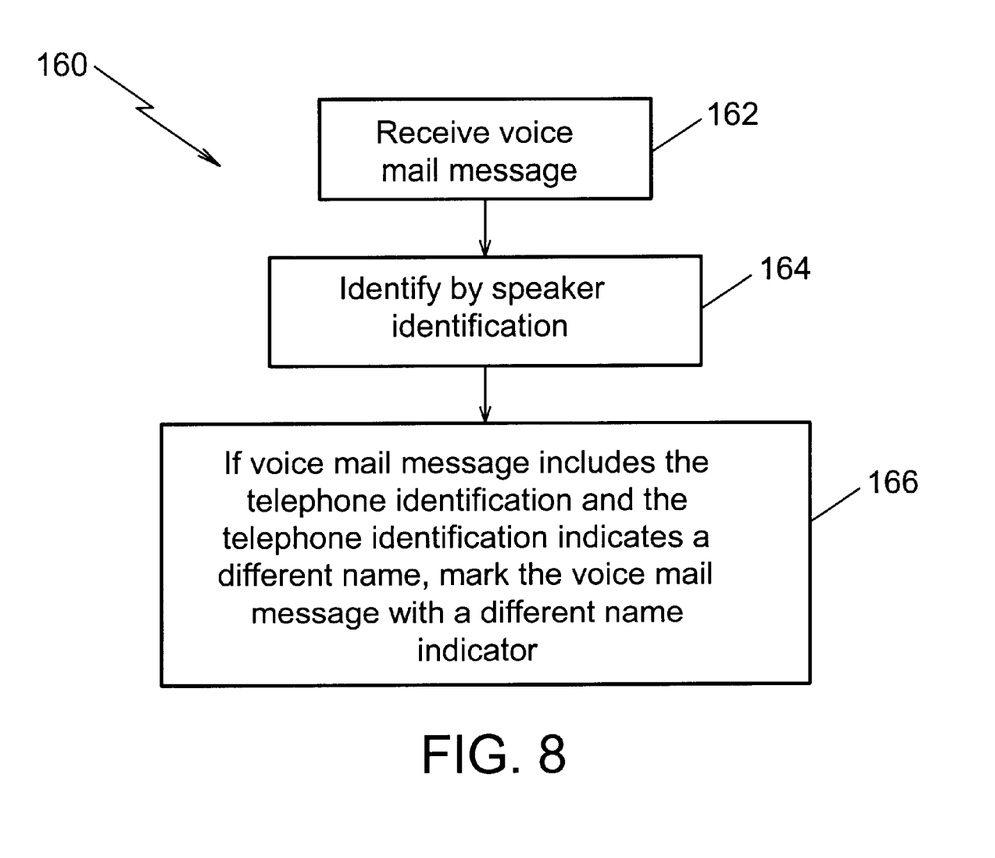
FIG. 8 illustrates an alternative method of identifying voice mail messages of the present invention.

An alternative voice mail identification method of the present invention is illustrated in FIG. 8. The alternative voice mail identification method 160 includes thirteenth, fourteenth, and fifteenth steps, 162, 164, and 166. In the thirteenth step 162, the voice mail message is received. In the fourteenth step 164, the voice mail message is identified by the preferred speaker identification 108 (FIG. 4). In the fifteenth step 166, the name indicator for the voice mail message is compared to the telephone identification if the telephone identification exists. If the telephone identification indicates a different name indicator than the name indicator, the voice mail message is also identified with the different name indicator.

Figure 9:
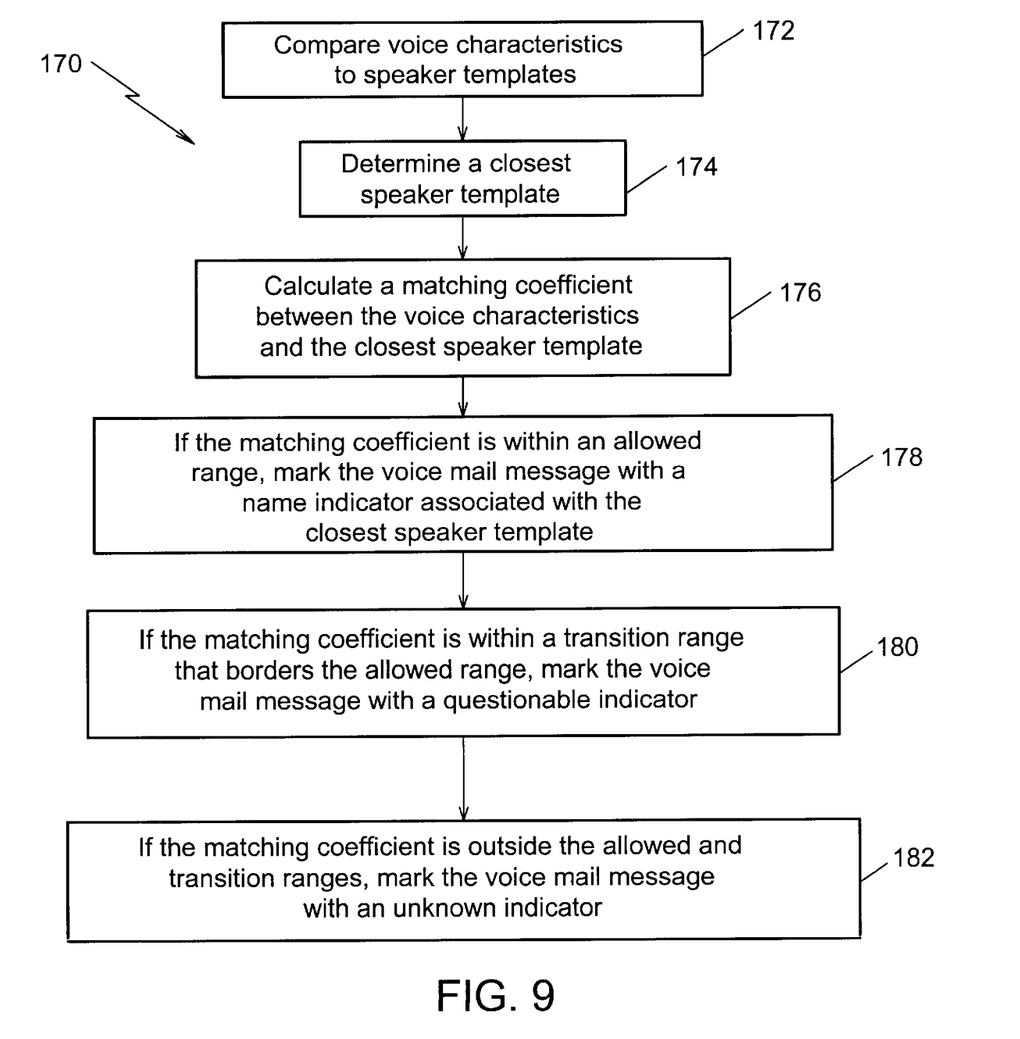
FIG. 9 illustrates an alternative speaker identification method of the present invention.

An alternative speaker identification method of the present invention is illustrated in FIG. 9. The alternative speaker identification method 170 includes sixteenth, seventeenth, eighteenth, nineteenth, twentieth, and twenty-first steps, 172, 174, 176, 178, and 180. In the sixteenth step 172, the voice characteristics are compared to the speaker templates. In the seventeenth step 174, the closest speaker template is determined. In the eighteenth step 176, the matching coefficient is calculated. In the nineteenth step 178, the voice mail message is marked with the name indicator associated with the closest speaker template provided that the matching coefficient is within the allowed range. In the twentieth step 180, the voice mail message is marked with a questionable indicator if the matching coefficient is within a transition range that borders the allowed range. In the twenty-first step 182, the voice mail message is marked with the unknown indicator if the matching coefficient is outside the allowed and transition ranges.

Figure 10:
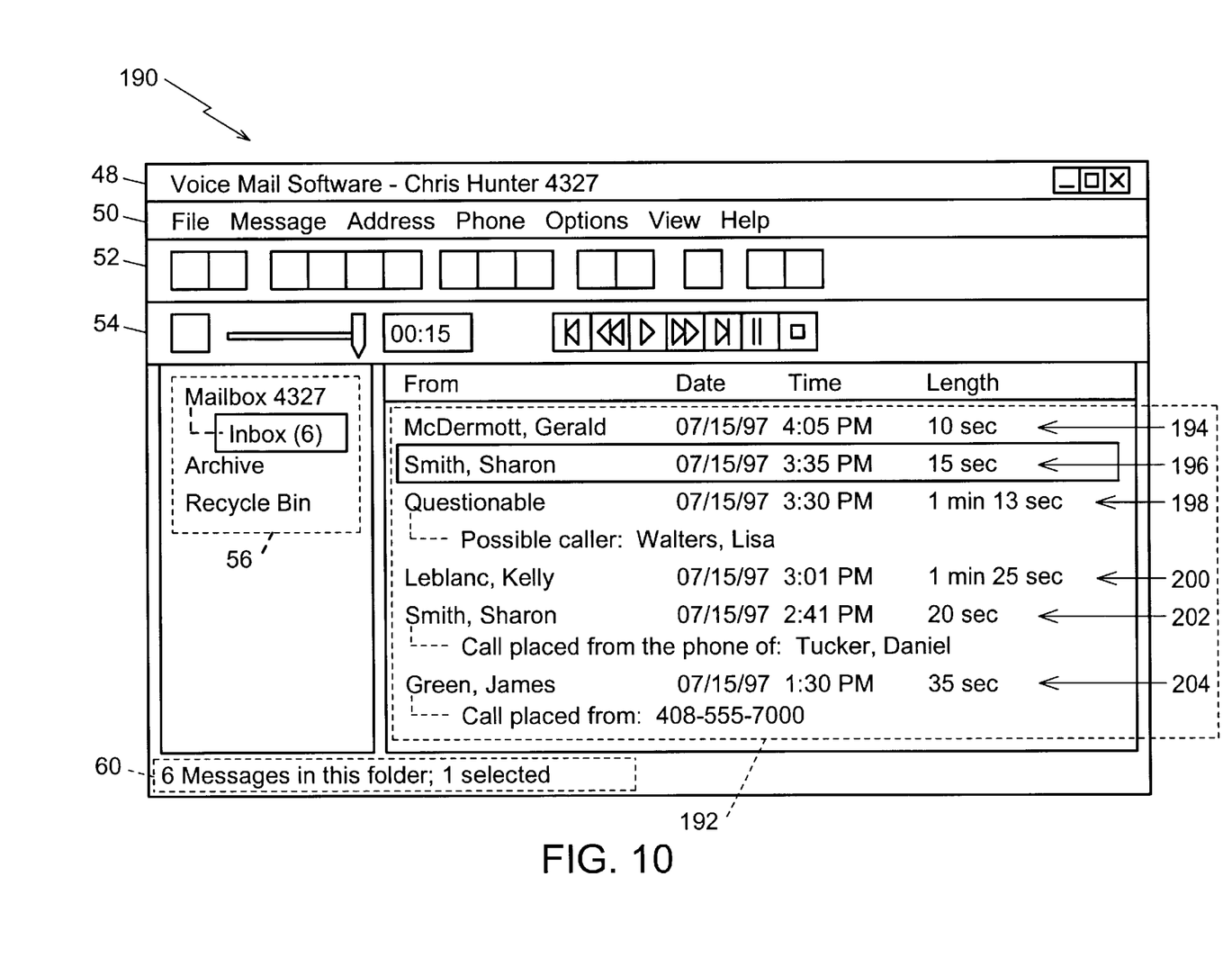
FIG. 10 illustrates an alternative voice mail GUI of the present invention.

An alternative voice mail GUI of the present invention is illustrated in FIG. 10. The first alternative voice mail GUI 190 incorporates the alternative voice mail identification method 160 and the alternative speaker identification method 170. The alternative voice mail GUI 190 is identical to the voice mail GUI 130 of FIG. 6 with the exception that the preferred message list 132 of the voice mail GUI 130 has been replaced with an alternative message list 192 in the alternative voice mail GUI 190.

In the alternative message list 192, a seventh voice mail message 194, with the name indicator of "McDermott, Gerald," has been identified using the alternative speaker identification method 170. An eighth voice mail message 196, with the name indicator of "Smith, Sharon," has been identified using the alternative speaker identification method 170, which confirmed the name indicator using the number identification. A ninth voice mail message 198 is identified with the questionable indicator and is also identified with a possible caller named "Walters, Lisa," since the matching coefficient is within the transition range.

A tenth voice mail message 200, with the name indicator of "Leblanc, Kelly," has been identified using the alternative speaker identification method 170. An eleventh voice mail message 202, with the name indicator of "Smith, Sharon," has been identified using the alternative speaker identification method 170. The eleventh voice mail message 202 has also been identified as having been placed from the telephone of "Tucker, Daniel," using the number identification. A twelfth voice mail message 204, with the name indicator of "Green, James," has been identified by the alternative speaker identification method 170. The twelfth voice mail message 204 has also been identified as having been placed from "408 555 7000" using the number identification.

The preferred speaker identification method 108, in general, will correctly identify a particular message as being from a particular caller provided that a particular caller's speaker template is present. However, first, second, or third error scenarios could occur, especially if the training data is limited.

In the first error scenario, the particular caller's speaker template is present and the preferred speaker identification method 108 fails to identify the particular message as being from the particular caller so that a particular identification becomes a false negative identification. In the second error scenario, the particular caller's speaker template is not present and the preferred speaker identification method 108 misidentifies the particular message so that the particular identification becomes a false positive identification. In the third error scenario, the particular caller's speaker template is present and the preferred speaker identification method 108 both fails to identify the particular message as being from the particular caller and misidentifies the particular message so that the particular identification is both the false negative identification and the false positive identification.

Figure 11:
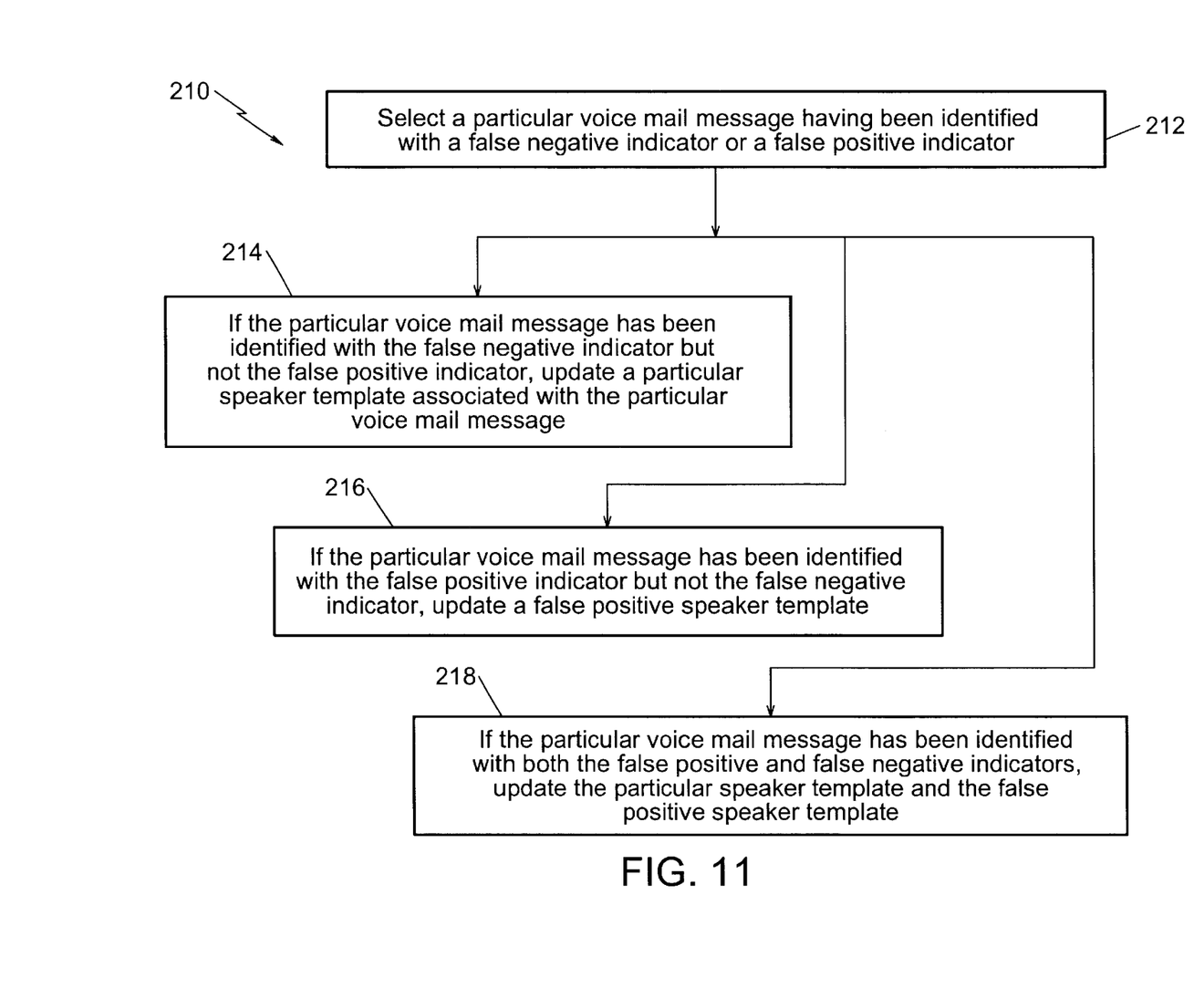
FIG. 11 illustrates a name indicator correction method of the present invention.

A name indicator correction method of the present invention, for the first, second, and third error scenarios, is illustrated in FIG. 11. The name indicator correction method 210 includes twenty-second, twenty-third, twenty-fourth, and twenty-fifth steps, 212, 214, 216, and 218. In the twenty-second step 212, the particular message is selected for the name indicator correction method 210. Next, the twenty-third step 214 is selected if the particular identification is the false negative identification only. The twenty-third step 214 updates the speaker template for the particular caller so that a future message from the particular caller will be identified. Alternatively, the twenty-fourth step 216 is selected if the particular identification is the false positive identification only. The twenty-fourth step 216 updates a false positive speaker template so that the future message from the particular caller will not be associated with the false positive speaker template. Further alternatively, the twenty-fifth step 218 is selected if the particular identification is both the false negative identification and the false positive identification. The twenty-fifth step 218 updates the speaker template for the particular caller and updates the false positive speaker template so that the future message from the particular caller will be identified correctly.

Testing was performed using the preferred speaker template generation method 150 (FIG. 7) and the preferred speaker identification method 108 (FIG. 4). Test data included twenty four sentences spoken by one hundred different speakers. The twenty four sentences for each of the one hundred different speakers were about two minutes in duration. Twelve of the twenty four sentences for each of the one hundred different speakers were used to generate the VQ codebooks using the preferred speaker template generation method 150. Remaining twelve of the twenty four sentences for each speaker were used as sample voice mail messages.

The voice characteristics for each of the sample voice mail messages were compared to the VQ codebooks using the preferred speaker identification method 108. A tuning parameter for the threshold distortion, referred to as delta, was used to adjust a success and a false acceptance. The delta, the success, and the false acceptance for the testing are listed in Table 1. Note that the voice characteristics were compared to all of the VQ codebooks and no attempt was made to distinguish between multiple matches of the voice characteristics of a single sample voice mail message with the VQ codebooks. So the test data indicate an increasing success and an increasing false acceptance with a larger delta or a larger threshold parameter, which is to be expected.

TABLE 1

| Delta | Success | False Acceptance |
|-------|---------|------------------|
| 0.07  | 72%     | 0%               |
| 0.08  | 93      | 1                |
| 0.09  | 98      | 5                |
| 0.10  | 98      | 11               |

It will be readily apparent to one skilled in the art that other various modifications may be made to the preferred embodiment without departing from the spirit and scope of the invention as defined by the appended claims.

I claim:

1. A method of identifying voice mail messages comprising the steps of:
   a. identifying a voice mail message using speaker recognition of a caller's voice; and
   b. coupling an indicator to the voice mail message, wherein the indicator designates one of a plurality of certainty levels as to the caller's identity based on an acceptable range of recognition.

2. The method of claim 1 wherein the speaker recognition includes the steps of
   a. comparing the voice mail message to existing voice samples in order to determine a matching coefficient, the matching coefficient corresponding to a closest existing voice sample; and
   b. categorizing the voice mail message as a matched voice mail message for the matching coefficient being within an allowed range, wherein the acceptable range includes the allowed range.

3. The method of claim 2 further comprising the steps of:
   a. receiving the voice mail message; and
   b. coupling the indicator as a name indicator to the matched voice mail message, the name indicator being associated with the closest existing voice sample.

4. The method of claim 2 further comprising the steps of:
   a. categorizing the voice mail message as a non-matched voice mail message for the matching coefficient being outside the acceptable range; and
   b. coupling the indicator as an unknown indicator to the non-matched voice mail message.

5. The method of claim 4 further comprising the steps of:
   a. selecting the non-matched voice mail message;
   b. creating an additional voice sample using the non-matched voice mail message;
   c. inputting a new name indicator that corresponds to the additional voice sample; and
   d. adding the additional voice sample to the existing voice samples.

6. The method of claim 2 further comprising the steps of:
   a. categorizing the voice mail message as a questionable voice mail message for the matching coefficient being within a transition range that borders the allowed range, wherein the acceptable range includes the transition range; and
   b. coupling the indicator as a questionable indicator to the questionable voice mail message.

7. The method of claim 2 further comprising the steps of:
   a. categorizing the voice mail message as a non-matched voice mail message for the matching coefficient being outside the allowed range and a transition range, wherein the acceptable range includes the transition range; and
   b. coupling the indicator as an unknown indicator to the non-matched voice mail message.

8. The method of claim 1 further comprising the step of displaying information of the caller based on the speaker recognition, wherein the caller information includes the indicator.

9. The method of claim 3 further comprising the step of transforming a digital version of the voice mail message to voice characteristics.

10. The method of claim 8 wherein the step of comparing the voice mail message to the existing voice samples includes comparing the voice characteristics to speaker templates, each of the speaker templates being associated with one and only one of the existing voice samples.

11. The method of claim 10 wherein the step of transforming the digital version of the voice mail message uses a vector quantization technique.

12. The method of claim 11 wherein the speaker templates are vector quantization codebooks.

13. The method of claim 3 wherein the name indicator is one of a quantity of name indicators and further wherein the quantity of name indicators are prioritized within a hierarchy such that a voice mail recipient listens to multiple voice mail messages in accordance with the hierarchy.

14. The method of claim 3 wherein a telephone number identification confirms that the voice mail message originated at a telephone number associated with the closest existing voice sample.

15. The method of claim 3 wherein a telephone number identification indicates that the voice mail message originated at a telephone number associated with a different existing voice sample.

16. The method of claim 15 further comprising the step of coupling a different name indicator to the name indicator, the different name indicator corresponding to the telephone number identification and the different existing voice sample.

17. The method of claim 3 wherein the existing voice samples were created from previous voice mail messages.

18. The method of claim 3 further comprising the step of updating the closest existing voice sample using the voice mail message.

19. The method of claim 3 further comprising the steps of:
   a. selecting the matched voice mail message, the matched voice mail message having a false positive name indicator, the matched voice mail message being from particular caller; and
   b. updating the existing voice sample for the false positive name indicator such that a future voice mail message form the particular caller will not result in an additional false positive name indicator being coupled to the future voice mail message.

20. The method of claim 3 further comprising the steps of:
   a. selecting a non-matched voice mail message, the non-matched voice mail message having a false negative name indicator, the non-matched voice mail message being form a particular caller; and
   b. updating a particular existing voice sample for the particular caller such that a future voice mail message from the particular caller will be identified as being from the particular caller.

21. The method of claim 3 further comprising the steps of:
   a. selecting the matched voice mail message, the matched voice mail message having a false positive name indicator, the matched voice mail message being from a particular caller; and
   b. creating a particular voice sample for the particular caller such that a future voice mail message from the particular caller will be identified as being from the particular caller.

22. A method of identifying voice mail messages comprising the steps of:
   a. receiving a voice mail message;
   b. computing feature vectors for the voice mail message using a vector quantization technique;
   c. comparing the feature vectors to vector quantization codebooks in order to determine a matching coefficient, the vector quantization codebooks corresponding to existing voice samples, the matching coefficient corresponding to a closest vector quantization codebook, which corresponds to a closest existing voice sample; and
   d. coupling an indicator to the vector quantized voice mail message, wherein if the matching coefficient is within an allowed range, then the indicator is a name indicator corresponding to the closest existing voice sample, further wherein if the matching coefficient is within a transition range that borders the allowed range, then the indicator is a questionable indicator, further wherein if the matching coefficient is outside the allowed range and the transition range, then the indicator is an unknown indicator.

23. A voice mail apparatus comprising:
   a. a user interface for receiving a voice mail message from a caller and for allowing access by a recipient to the voice mail message;
   b. a processing unit coupled to the user interface, the processing unit comparing the voice mail message to existing voice samples of the caller in order to determine a matching coefficient, the matching coefficient corresponding to a closest existing voice sample of the caller, the processing unit coupling an indicator to the voice mail message, wherein the indicator designates one of a plurality of certainty levels as to the caller's identity based on an acceptable range of recognition; and
   c. a storage media coupled to the processing unit for storing the voice mail message.

24. The voice mail apparatus of claim 23 wherein the matching coefficient is outside the acceptable range and further wherein the indicator is coupled as an unknown indicator to the voice mail message.

25. The voice mail apparatus of claim 24 wherein the acceptable range includes a transition range that borders the allowed range and the matching coefficient is within the transition range and further wherein the indicator is coupled as a questionable indicator to the voice mail message.

26. The voice mail apparatus of claim 25 wherein the matching coefficient is outside the allowed and transition ranges and further wherein the indicator is coupled as an unknown indicator to the voice mail message.

27. The voice mail apparatus of claim 23 wherein the processing unit transforms a digital version of the voice mail message to voice characteristics and further wherein the voice characteristics are compared to speaker templates associated with each of the existing voice samples in order to determine the matching coefficient.

28. The voice mail apparatus of claim 27 wherein the voice characteristics are vector quantization data.

29. The voice mail apparatus of claim 28 wherein the speaker templates are vector quantization codebooks.

30. The voice mail apparatus of claim 23 wherein the indicator is one of a quantity of name indicators and further wherein the quantity of name indicators are prioritized within a hierarchy such that the recipient listens to multiple voice mail messages in accordance with the hierarchy.

31. The voice mail apparatus of claim 23 wherein the processing unit confirms that the voice mail message originated at a telephone number associated with the closest existing voice sample.

32. The voice mail apparatus of claim 23 wherein the processing unit indicates that the voice mail message originated at a telephone number associated with a different existing voice sample and further wherein the processing unit couples a different name indicator to the indicator, wherein the indicator is a name indicator, the different name indicator being associated with the telephone number.

33. The voice mail apparatus of claim 23 wherein the existing voice samples were created from previous voice mail messages.

34. The voice mail apparatus of claim 23 wherein the acceptable range includes an allowed range, and the matching coefficient is within the allowed range, further wherein the indicator is coupled as a name indicator to the voice mail message.

35. The voice mail apparatus of claim 23 further comprising a display device for displaying information of the caller based on the comparison, wherein the caller information includes the indicator.

36. A voice mail apparatus comprising:
   a. a user interface for receiving a voice mail message from a caller and for allowing access by a recipient to the voice mail message;
   b. a processing unit coupled to the user interface, the processing unit computing feature vectors for the voice mail message using a vector quantization technique, the processing unit comparing the feature vectors to vector quantization codebooks in order to determine a matching coefficient, the vector quantization codebooks corresponding to existing voice samples of the caller, the matching coefficient corresponding to a closest vector quantization codebook, which corresponds to a closest existing voice sample of the caller, the processing unit coupling an indicator to the voice mail message, wherein if the matching coefficient is within an allowed range, then the indicator is a name indicator corresponding to the closest existing voice sample, further wherein if the matching coefficient is within a transition range that borders the allowed range, then the indicator is a questionable indicator, further wherein if the matching coefficient is outside the allowed range and the transition range, then the indicator is an unknown indicator; and c. a storage media coupled to the processing unit for storing the voice mail message.

37. An article of manufacture comprising a computer readable medium bearing computer program code embodied therein for use with a computer coupled to a telephone line, the computer program code including means for identifying a voice mail message using speaker recognition of a caller's voice and means for coupling an indicator to the voice mail message, whereby the indicator designates one of a plurality of certainty levels as to the caller's identity based on an acceptable range of recognition.

38. The article of manufacture of claim 34 wherein the means for speaker recognition includes:
  a. means for comparing the voice mail message to existing voice samples in order to determine a matching coefficient, the matching coefficient corresponding to a closest existing voice sample; and
  b. means for categorizing the voice mail message as a matched voice mail message for the matching coefficient being within an allowed range, wherein the acceptable range includes the allowed range.

39. The article of manufacture of claim 38 further comprising:
  a. means for categorizing the voice mail message as a non-matched voice mail message for the matching coefficient being outside the acceptable range; and
  b. means for coupling the indicator as an unknown indicator to the non-matched voice mail message.

40. The article of manufacture of claim 38 further comprising:
  a. means for categorizing the voice mail message as a questionable voice mail message for the matching coefficient being within a transition range that borders the allowed range, wherein the acceptable range includes the transition range; and
  b. means for coupling the indicator as a questionable indicator to the questionable voice mail message.

41. The article of manufacture of claim 38 further comprising:
  a. means for categorizing the voice mail message as a non-matched voice mail message for the matching coefficient being outside the allowed range and a transition range, wherein the acceptable range includes the transition range; and
  b. means for coupling the indicator as an unknown indicator to the non-matched voice mail message.

42. The article of manufacture of claim 38 further comprising:
  a. means for receiving a voice mail message; and
  b. means for coupling the indicator as a name indicator to the matched voice mail message, the name indicator being associated with the closest existing voice sample.

43. The article of manufacture of claim 39 further comprising:
  a. means for selecting the non-matched voice mail message;
  b. means for creating an additional voice sample using the non-matched voice mail message;
  c. means for inputting a new name indicator that corresponds to the additional voice sample; and
  d. means for adding the additional voice sample to the existing voice samples.

44. The article of manufacture of claim 42 further comprising means for transforming a digital version of the voice mail message to voice characteristics.

45. The article of manufacture of claim 44 wherein the means for comparing the voice mail message to the existing voice samples includes means for comparing the voice characteristics to speaker templates, each of the speaker templates being associated with one and only one of the existing voice samples.

46. The article of manufacture of claim 45 wherein the means for transforming the digital version of the voice mail message uses a vector quantization technique.

47. The article of manufacture of claim 46 wherein the speaker templates are vector quantization codebooks.

48. The article of manufacture of claim 42 wherein the indicator is one of a quantity of name indicators and further wherein the quantity of name indicators are prioritized within a hierarchy such that a voice mail recipient listens to multiple voice mail messages in accordance with the hierarchy.

49. The article of manufacture of claim 42 wherein a telephone number identification confirms that the voice mail message originated at a telephone number associated with the closest existing voice sample.

50. The article of manufacture of claim 42 wherein a telephone number identification indicates that the voice mail message originated at a telephone number associated with a different existing voice sample.

51. The article of manufacture of claim 50 further comprising means for coupling a different name indicator to the name indicator, the different name indicator corresponding to the telephone number identification and the different existing voice sample.

52. The article of manufacture of claim 42 wherein the existing voice samples were created from previous voice mail messages.

53. The article of manufacture of claim 42 further comprising means for updating the closest existing voice sample using the voice mail message.

54. The article of manufacture of claim 42 further comprising:
  a. means for selecting the matched voice mail message, the matched voice mail message having a false positive name indicator, the matched voice mail message being from a particular caller; and
  b. means for updating the existing voice sample for the false positive name indicator such that a future voice mail message form the particular caller will not result in an additional false positive name indicator being coupled to the future voice mail message.

55. The article of manufacture of claim 42 further comprising:
  a. means for selecting a matched voice mail message, the matched voice mail message having a false positive name indicator, the matched voice mail message being form a particular caller; and b. means for updating a particular existing voice sample for the particular caller such that a future voice mail message from the particular caller will be identified as being from the particular caller.

56. The article of manufacture of claim 42 further comprising the steps of:
   a. means for selecting the matched voice mail message, the matched voice mail message having a false positive name indicator, the matched voice mail message being from a particular caller; and
   b. means for creating a particular voice sample for the particular caller such that a future voice mail message from the particular caller will be identified as being from the particular caller.

\* \* \* \* \*

UNITED STATES PATENT AND TRADEMARK OFFICE
CERTIFICATE OF CORRECTION

PATENT NO. : 6,529,870 B1
DATED : March 4, 2003
INVENTOR(S) : Rajendra Prasad Mikkilineni It is certified that error appears in the above-identified patent and that said Letters Patent is hereby corrected as shown below:

<u>Title page,</u>
Item [56], References Cited, OTHER PUBLICATIONS, "Intuity UDIX Multimedia Messaging System" is replaced by -- Intuity AUDIX Multimedia Messaging System. --

<u>Column 5,</u>
Line 13, after "the present invention is" add -- illustrated in FIG. 7. The preferred speaker template generation method 150 includes --.

<u>Column 8,</u>
Line 40, replace "The method of claim 8" with -- The method of claim 9 --.

<u>Column 9,</u>
Line 9, replace "from particular caller" with -- from a particular caller --.

<u>Column 10,</u>
Line 11, replace "The voice mail apparatus of claim 24" with -- The voice mail apparatus of claim 34 --.

<u>Column 11,</u>
Line 26, replace "The article of manufacture of claim 34" with -- The article of manufacture of claim 37 --.

Signed and Sealed this

Twenty-fourth Day of June, 2003

JAMES E. ROGAN
*Director of the United States Patent and Trademark Office*